United States Patent [19]

Kuecken

[11] 3,796,950

[45] Mar. 12, 1974

[54] MEASUREMENT APPARATUS

[75] Inventor: John A. Kuecken, Pittsford, N.Y.

[73] Assignee: Radionics, Inc., Webster, N.Y.

[22] Filed: June 18, 1973

[21] Appl. No.: 370,666

[52] U.S. Cl............................ 324/61 R, 324/DIG. 1
[51] Int. Cl............................................. G01r 27/02
[58] Field of Search...... 324/61 R, 59, 57 R, DIG. 1

[56] References Cited
UNITED STATES PATENTS

| | | | |
|---|---|---|---|
| 2,476,496 | 7/1949 | Kliever | 324/61 R X |
| 2,826,738 | 3/1958 | Lupfer et al. | 324/61 R |
| 2,982,911 | 5/1961 | Fluegel et al. | 324/61 R X |
| 2,985,826 | 5/1961 | Fluegel | 324/61 R |
| 3,179,881 | 4/1965 | Ichijo | 324/61 R X |
| 3,757,211 | 9/1973 | Goto | 324/61 R |

Primary Examiner—Stanley T. Krawczewicz
Attorney, Agent, or Firm—Samuel R. Genca

[57] ABSTRACT

A measurement apparatus is disclosed which is adapted to make physical measurements as a function of variations in a parameter includes means for producing a modulated AC signal, a bridge circuit coupled to the AC signal and having a plurality of terminals, a reference impedance coupled to one terminal of the bridge circuit, a probe member coupled to another terminal of the bridge circuit and defining an impedance parameter which varies as a function of the variations in the measurement parameter, and output means including an envelope detector being coupled to still another terminal of the bridge and adapted to produce an output signal indicative of the physical measurement which is related to the probe member impedance parameter.

9 Claims, 7 Drawing Figures

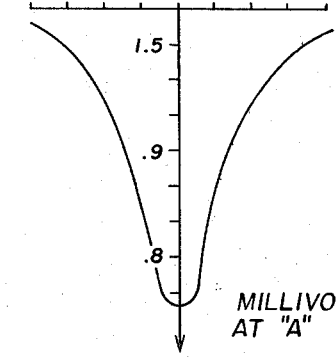
FIG. 2A
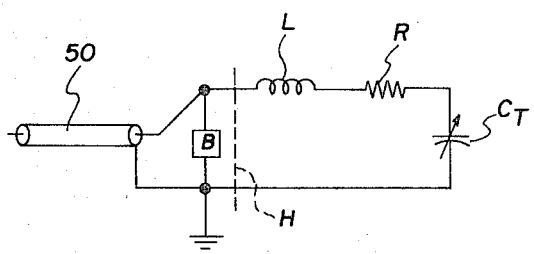
FIG. 3
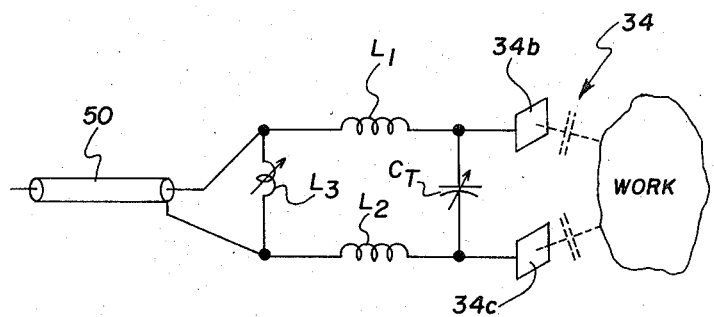
FIG. 4
FIG. 5
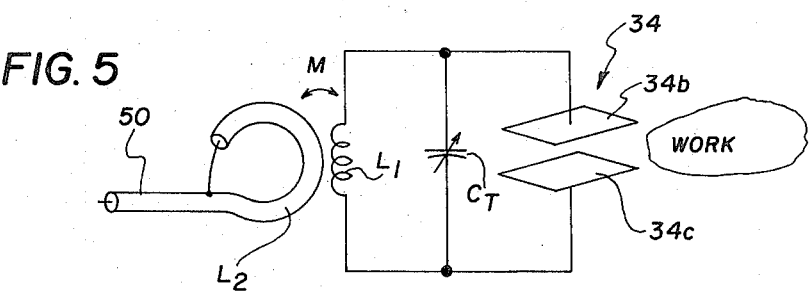
FIG. 6
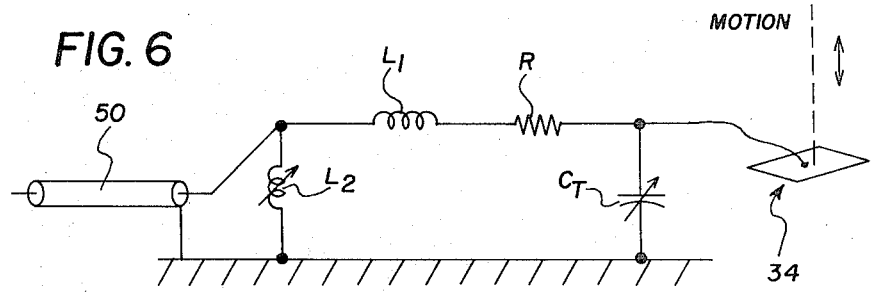

MEASUREMENT APPARATUS

BACKGROUND OF THE INVENTION

1. Field of the Invention

The present invention relates to apparatus for performing physical measurements by using variations in electrical parameters.

2. Description of the Prior Art

Heretofore, it has been extremely difficult for non-contacting instruments to make accurate measurements of physical parameters. For example, it is difficult to measure the moisture in a moving web (paper or cloth) and to make minute physical displacements (such as wobble) in rapidly turning shafts or gears. Prior apparatus require critical settings and often have output ambiguities. Many times, micro-wave type instruments are used which reflect waves off of an object having some parameter to be measured. Such microwave type instruments require very high voltage, and are difficult to adjust.

Existing non-contact gauging apparatus generally comes in one of two formats: devices in which the stray capacitance to the material being gauged serves to alter the frequency of oscillation of a free-running radio frequency oscillator and devices in which the effects of induced eddy-currents in the workpiece tend to unbalance a carefully nulled transformer, generally operating at some relatively high audio frequency. In the former, the frequency of oscillation is generally a non-linear function of the distance to the workpiece and the device stability tends to suffer from temperature sensitivity of the oscillator and the associated inductor. In the latter, the eddy current effect is strongly dependent upon the resistivity of the material, which is naturally a function of the temperature of the material. Both types of non-contacting gauges tend to be significantly effected by the length and termination impedance of the transmission line connecting the sensing unit to the remainder of the circuitry.

SUMMARY OF THE INVENTION

Accordingly, it is an object of the invention to provide an improved non-contacting apparatus for making physical measurements.

It is a further object of the invention to provide a measurement apparatus which has long life, high reliability, and is generally free from shock or vibration.

A further object of the invention is to provide an apparatus which is able to distinguish extremely small differences in variations in a physical parameter such as for example, moisture in a moving web or variations in a dimension.

It is another object of this invention to provide a basic radio-frequency non-contacting sensor, possessed of a substantial linear range, which is capable of operating in either the magnetic or the electric (capacitive) mode so that the device may be used to sense motion or properties of either conductors or dielectrics.

It is a further object of this invention to provide a non-contacting measurement apparatus which derives an exceptional measure of stability from the use of a quartz-crystal controlled frequency and one of several exceptionally stable modulation techniques.

It is a still further object of this invention to provide a non-contact measurement apparatus which translates the parameter to be measured into a voltage-standing wave-ratio on a coaxial transmission line; thereby rendering the apparatus insensitive to variations in cable length. The length of this line (being of constant and standardized characteristic impedance) may be varied by the inclusion of extensions without varying the voltage-standing-wave-ratio which is the electrical parameter being measured.

In accordance with one disclosed embodiment of the invention, measurement apparatus is provided which includes means for producing a modulated two-tone envelope signal, a bridge circuit having a plurality of terminals including one of which is coupled to a reference impedance and another of which is coupled to the probe which makes a physical measurement of a parameter. The probe has an impedance which varies as a function of variation in a physical parameter and which is referenced against the reference impedance. Coupled to the output of the terminals of the bridge is an output circuit which in response to variations in the reactance of the probe, produces an output signal representative thereof and of the physical measurement.

It is a feature of the invention that apparatus in accordance with it are able to distinguish extremely minute differences in a physical dimension.

Other objects and advantages of the invention will become apparent from the detailed description of the preferred embodiment presented below.

BRIEF DESCRIPTION OF THE DRAWINGS

In the detailed description of the preferred embodiments of the invention presented below, reference is made to the accompanying drawings in which:

FIG. 2a is a graph showing output voltage at point A in FIG. 2 taken with respect to pressure variations at the probe of FIG. 2;

FIG. 3 is a diagram of a coaxial cable and the probe showing in schematic form elements thereof; and FIGS. 4 through 6 show further details of different probes in accordance with the invention which may be utilized in the apparatus of FIG. 1.

DESCRIPTION OF THE PREFERRED EMBODIMENTS

Figure 1:
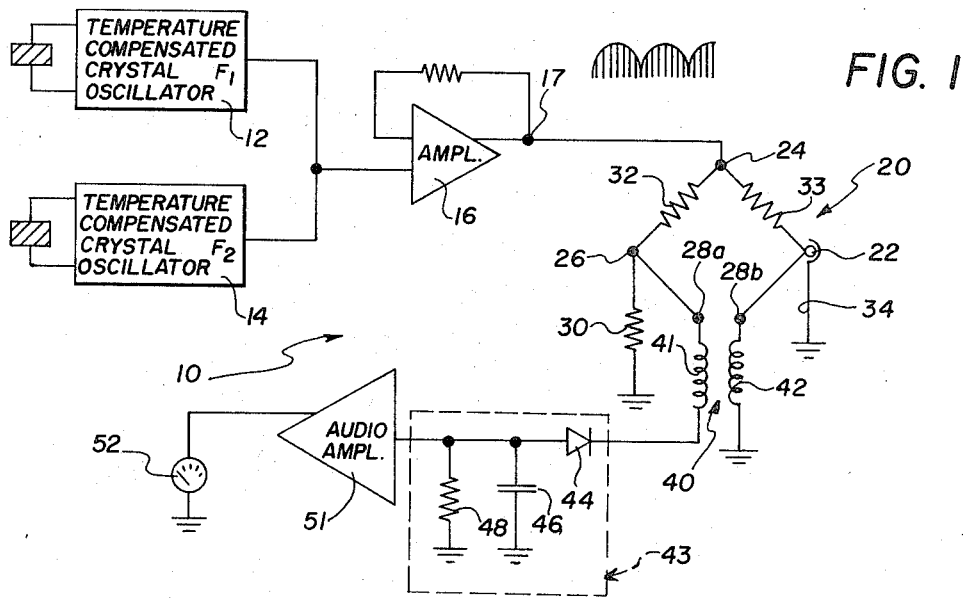
FIG. 1 is a diagram partially in block and partially in schematic form of apparatus in accordance with the invention.

A preferred embodiment of the invention is disclosed in FIG. 1 in connection with an instrument for measuring physical measurements. Because such instruments have many elements which are well known in the art, the present disclosure will be directed in particular to elements forming part of or cooperating more directly with apparatus in accordance with the present invention, and it will be understood that elements and/or apparatus not specifically shown or described or shown only in schematic form may take various forms well known in the art.

Turning to FIG. 1, there is shown one form of apparatus or instrument 10 in accordance with the present invention. As shown, the instrument 10 includes two temperature-compensated crystal oscillators 12 and 14 which are yoked or coupled together through a leveling amplifier 16 to produce an exceptionally stable modulated AC signal in the radio frequency (RF) portion of the spectrum consisting of a two-tone envelope. This wave form is shown at point 17 in the circuit and is applied to a bridge 20.

Although the two crystal oscillator arrangements produce an exceptionally stable modulated signal and is a feature of this invention, it will be understood that other structures could be used to produce a stable modulated signal. In accordance with the invention, there is a need for a rather constant input voltage at the input to the bridge circuit 20. In a particular case, if the oscillators 12 and 14 are considered to be a two-volt source with a 50 ohm source impedance there may be variations in their output voltage. This is the reason for the inclusion of leveling amplifier 16. Such an amplifier is well known in the art and is included in the system to preserve sensitivity and accuracy. The amplifier 16 could be a so-called AGC amplifier which produces a constant output voltage, for example, 2 volts, notwithstanding variations in the impedance of a probe 34 connected to the bridge 20. To improve accuracy and linearity, the bridge 20 must be driven by an almost constant voltage. The reason for this is, it is variations in the probe impedance which are a function of a physical measurement and it is undesirable to introduce other signal variations which would distort the output of the apparatus. In actual practice, this voltage regulation is very nearly possible to obtain since it is possible to produce a bridge impedance seen by the generator which will not fall below about 33 ohms with a short circuit at the probe terminal 22 or 100 ohms if the probe is open circuited.

The bridge includes three other terminals: 24 (input terminal), 26 and 28a and 28b (output terminals). Coupled to the terminal 26 is a reference impedance 30 having a stable resistance. Two impedances 32 and 33 are coupled in arms of the bridge at the position shown. The probe member 34 shown more specifically in FIGS. 2, and 3 through 5 is connected to the terminal 22. If probe reactance which is seen at the terminal 22 is identical to the reference impedance 30, then at the output terminals 28a and b there will be zero volts. However, with any variation in the impedance at the probe as seen by the bridge 20, significant or measurable signals will appear across a balancing transformer 40 having windings 41 and 42, which transformed is coupled to an envelope detector 43 comprised of a diode 44 and a parallel connection of a capacitor 46 and a resistor 48. The output of the envelope detector 43 is applied to an audio amplifier 51 which in turn drives a meter 52 the output indicator of which points to a scale indicating a range of variations in the physical measurement.

One reason for using an envelope detector 43 and audio amplifier 51 lies in the inherent advantage accruing to AC amplification and detection. Envelope detectors and audio amplifiers are inherently more stable and free from temperature drifts than are many other type devices. Therefore, since the envelope had a controlled frequency and spectrum, the audio amplifier 51 will be selectively tuned to reject noise and interference.

Figure 2:
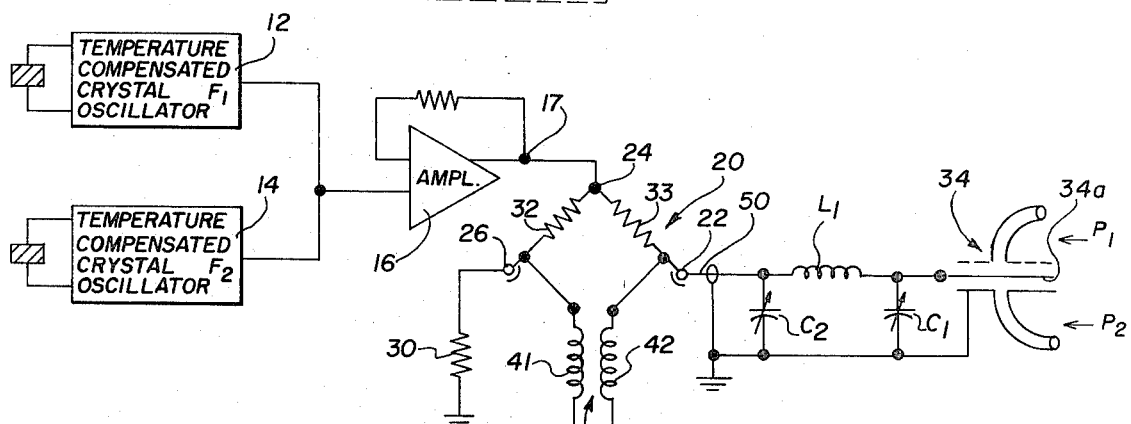
FIG. 2 is a similar diagram showing another apparatus in accordance with the invention and showing the probe in more detail.

Turning now to FIG. 2 wherein there is a similar apparatus as shown in FIG. 1. Thus, where similar elements are used they will carry the same numerals and, of course, need not be described.

As shown, the terminal 22 is actually connected to a coaxial cable 50 which is connected to a physical capacitor C2, a physical inductor L1 and a capacitance C1. The probe 34 is connected to the coaxial cable and is shown as actually defining the capacitance C1 connected to the capacitor C2, the capacitance parameter of C1 varies as a function of input pressure as is shown in the drawings. In fact, the apparatus is for measuring blood pressure and does this by measuring the displacement of a diaphram 34a. More specifically, the variation in C1 provides a variation of impedance or VSWR to the coaxial line 50. This VSWR or reflection is the parameter measured by the bridge 20. If the probe is adapted to present a nominal impedance of 50 ohms, or some other standard impedance level, a cable 50 of arbitrary length may be employed to connect the sensor to the terminal 22. Since a cable terminated in its characteristic impedance will present the characteristic impedance at any length, this cable 50 may be of any arbitrary length. It may be shown that if the resistance of the impedances associable with the bridge (viz., 30, 32 and 33) are selected with impedances equal to the characteristic impedance of the cable, and excited from an O-impedance source, the output signal applied to the envelope detector 43 will be proportional to the voltage reflection coefficient of the load. As is well known, this coefficient Voltage Standing Wave Ratio (VSWR) of the coaxial cable 50 which, of course, now becomes a function of the impedance of the probe 34. The detector applies a signal to a volt meter 60 which in turn applies a signal to a recorder 62 such as, for example, an Estertine-Angus or other chart and pen recorder.

FIG. 2a shows a graph of the variations in the output signals at point A in FIG. 2 with respect to variations in pressure at the diaphram 34a.

Referring now to FIG. 3, there is shown a general form of the impedance network in connection with the probe member 34. Although FIG. 3 is general in nature, it might be helpful to briefly refer back to FIG. 2. The impedance element C2 in FIG. 2 corresponds to B in FIG. 3 and the inductance L, and resistance R are representative of L1 in FIG. 2. Further, $C_T$(FIG. 3) represents C1 (FIG. 2) and is the parameter variation being measured which is representative of a physical measurement.

The following abbreviated analysis of FIG. 3 outlines the proportioning of the circuit parameters required to obtain a perfect impedance match (see also J. Kuecken — Antennas and Transmission Lines — ch 20, Howard W. Sams Pub. Indianapolis, Indiana). It may be seen in the following equations that the $\pm$ in front of the radical implies a generally dual-valued solution; thus B may be either inductive or capacitive as required.

As noted before, a suitable proportioning of the parameters of the sensing circuit will provide an impedance of $Z_0$ (viz., the same as reference impedance 30) to the terminal 22 and nulls the bridge 20.

To match a circuit of the form in FIG. 3 at position H shown in dotted lines:

$$Z_m = R + J(X_L - X_C) \tag{1}$$

$$Y_m = R/R^2+(X_L-X_C)^2 - J(X_L-X_C)/R^2+(X_L-X_C)^2 \tag{2}$$

And for matching, the real part of YM:

$$G_m = 1/Z_0 = R/R^2+(X_L-X_C)^2 \quad (3)$$

Thus:

$$(X_L-X_C)^2 = R/G_O - R^2 \quad (4)$$

$$\therefore (X_L-X_C) = \pm \sqrt{R/G_O - R^2} \quad (5)$$

In addition, the imaginary part of YM must be cancelled by $B_1$ which then can be selected to be either an inductor or a capacitor.

The probe 34 illustrated in FIG. 2 is an electrically unbalanced type, that is, one side of the capacitors C1 and C2 is operated at earth potential, corresponding to the potential of the outer conductor of the coaxial cable connecting the probe to the bridge. Capacitance C1 is actually made up of a physical capacitor $C_T$ and the capacitance of the workpiece, shown dotted in the Figures. This circuit is advantageous to use in cases where the workpiece whose motion to be measured may be directly grounded with a very short conductor to the outer conductor of the coaxial cable 50. This circuit is shown in somewhat expanded form in FIG. 6. In this case, C2 has been replaced with an inductor L2 corresponding to the alternate solution of equation 5. Also in this figure the resistance R corresponding to wL/Q of inductor L1 is shown as a physical rather than an implied component. In this illustration the instrument is being used to sense the motion of the workpiece with respect to the ground plane such as for example a device to measure the thickness of oil in a bearing. In many cases the workpiece is not grounded and may tend to assume some potential intermediate between earth and the high potential. In such cases it is advantageous to operate the probe 34 in a balanced or nearly balanced mode such that the potential of the two electrodes 34b and c are essentially symmetrically energized with respect to earth. The probe 34 illustrated in FIG. 4 is very nearly symmetrically excited and is thus described as a semi-balanced unit .. whereas the circuit shown in FIG. 5 may be essentially perfectly balanced with respect to earth it is described as a fully-balanced unit. A circuit of this nature was employed for the purpose of making moisture measurements in paper. The presence of water between the two electrodes 34b and c will significantly alter the capacitance of the electrodes thereby producing the reflected signal to be detected by the bridge.

It should also be noted that the motion of a conductive workpiece within the magnetic field of inductor L1 as shown in any of these figures will provide a similar reflection. In this case the device with proper design, can be rendered almost completely insensitive to dielectric materials and will read only on the conductive material. This is advantageous when the reading of motion of machine parts which may be coated with an oil or grease or paint is desired. For the magnetic applications described, the circuit of FIG. 6 is generally to be preferred since the probe 34 may be nearly perfectly shield electrostatically. A preferred configuration for L1 in this case employs a winding of ten to twenty turns on the center post of one half of a conventional ferrite or powdered iron "cup" core. The field of this unit is approximately one-half of a magnetic dipole field in shape. Motion of a conductive workpiece within this field will give a linear "shorted turn" effect to the inductor.

The invention has been described in detail with particular reference to a preferred embodiment thereof, but it will be understood that variations and modifications can be effected within the spirit and scope of the invention.

I claim:

1. In an apparatus for making measurements which are functions of variations in a physical parameter, the combination comprising:
   a. means for producing an AC signal;
   b. a bridge circuit responsive to said AC signal and having a plurality of terminals including a terminal coupled to a reference impedance and a probe member coupled to a second terminal and an output terminal;
   c. said probe member having an impedance related to said reference reactance and adapted to vary as a function of the physical parameter; and
   d. an output circuit coupled to said bridge circuit and including an envelope detector adapted to produce an output signal which is a function of variations in the probe impedance parameter and representative of a physical measurement.

2. Non-contacting apparatus for making physical measurements which are functions of variations in an electrical parameter comprising:
   a. means for producing a stable modulated AC signal;
   b. a bridge circuit responsive to said AC signal and having a plurality of terminals and a plurality of impedances located in arms thereof;
   c. a reference impedance coupled to one of said bridge terminals and a coaxial cable coupled to at one end to another of said terminals and having a probe member coupled to the other end of said coaxial cable and adapted to vary the reactance of the coaxial cable as seen by such other terminal in accordance with variations in an electrical parameter and produce a voltage standing wave; and
   d. an envelope detector coupled to a terminal of said bridge circuit and adapted to produce an output signal which is a function of variations in said voltage standing wave and is representative of the physical measurement.

3. The invention as set forth in claim 2 wherein said modulation signal producing means includes first and second crystal oscillators coupled together.

4. The invention as set forth in claim 2 including recording means responsive to said output signal for recording data representative of the physical measurement.

5. The invention as set forth in claim 2 including means coupling said modulation signal producing means to said bridge circuit for presenting a predetermined impedance to said bridge circuit.

6. The invention as set forth in claim 5 wherein said predetermined impedance is substantially zero.

7. The invention as set forth in claim 5 wherein said probe is coupled to a semi-balanced circuit having a plurality of reactance elements and said probe includes two electrodes.

8. The invention as set forth in claim 5 wherein said probe is coupled to a balanced circuit having a plurality of reactance elements and said probe includes two electrodes.

9. The invention as set forth in claim 5 wherein said probe is coupled to an un-balanced circuit having a plurality of reactance elements.

* * * * *